July 19, 1938.  R. L. HARROUN  2,123,995
INSECT POISON CONTAINER
Filed May 2, 1935

R. L. HARROUN
INVENTOR.
by Stone Boyden & Mack
Attorneys.

Patented July 19, 1938

2,123,995

UNITED STATES PATENT OFFICE 2,123,995

INSECT POISON CONTAINER

Robert L. Harroun, Miami, Fla.

Application May 2, 1935, Serial No. 19,428

3 Claims. (Cl. 43—131)

This invention relates to containers for insecticides, especially to hold material for the extermination of insects.

The general object of this invention is to provide a container by the use of which the poisonous material is readily accessible to insects, but substantially covered against inadvertent use by human beings, household pets, and animals generally.

A further object is to provide a container which will permit poison to be placed in such locations as bread boxes and refrigerators and the like, without danger of dislodgment of the poison from the container, thus to come into contact with the food to contaminate it.

Another object is to provide a container for insecticides and poisons which can be manufactured and sold cheaply.

Another object is to provide a container for insecticides of such shape and size as to permit its being placed in cracks and other places where vermin frequent, and of an appearance which will not make objectionable the placing of the same openly in bookcases, on shelves and tables.

Another object is to provide a container in which there is a poison base to which may be added a drop of moisture, water, or grease, or other substance such as may be attractive to the particular species of insect to be destroyed, without either the poison base or added material being readily reached from the exterior of the container by animals.

Another object is to provide a container for insecticides which will lend itself to economical packing and shipping, and which will constitute an attractive sales display.

Another object is to provide a container for insecticides which can be stepped on without injury to the bare foot, and which, when overturned, does not release the insecticidal ingredients.

Other features of the invention will be apparent from the following description considered in connection with the accompanying drawing, in which.

Figure 1:
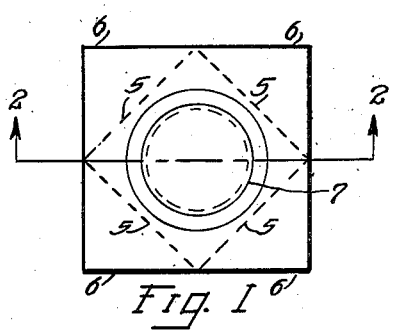
Fig. 1 illustrates a square of thin sheet metal comprising a blank from which the container is formed.
Figure 3:
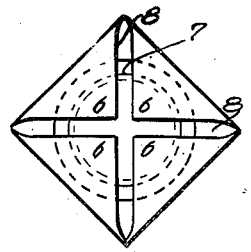
Fig. 3 is a top plan view of the completed container.

Referring in detail to the several views of the drawing, it will be noted by reference to Fig. 1 that the blank is of polygonal shape, specifically square, and is adapted to have its corners 6 folded over on the dotted lines 5 so that the corners project toward the center but are spaced therefrom and from each other, as shown in the plan view in Fig. 3. Thus the edge walls of the folded over portions provide the sides of the final article which is likewise polygonal in plan view.

The bottom of the central portion of the blank 10 is provided with a struck-up ridge constituting a rim 7 around a central bottom portion 9, the arrangement serving somewhat as a pan for the reception of the insecticidal material, which preferably is of a nature to become liquid by the application of heat and to solidify upon cooling. The rim 7 thus retains the poison which is poured into it as a liquid and hardens, adhering firmly to the metal of the bottom 9 and encircling rim 7.

Figure 4:
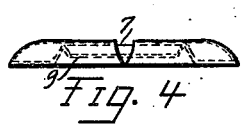
Fig. 4 is an edge view or elevation looking at one corner of the container shown in Fig. 3.

It will be apparent that the folded over corners 6 extend over the rim 7 and are spaced therefrom slightly, as shown in Fig. 4, and thus also spaced from any poisonous material contained within the rim, provided the poison does not extend above the rim. This arrangement provides slots 8 between the corner portions 6 and extending diagonally across the surface of the container. Insects are enabled to reach the poison through the slots 8 by means of their proboscides or tongues and small insects such as small ants would be enabled to crawl into the slots, whereas no animal would be able to extend a portion of its body through such narrow openings.

Figure 2:
Fig. 2 is a sectional view taken on the line 2—2 of Fig. 1.

It will be noted by reference to the sectional view Fig. 2, that the corner portions of the completed device are substantially in a common plane which thus provides a plurality of supporting points to enable the container to be steady in an upright position. It will also be noted that the central depressed portion 9 is an integral part of the whole and together with the rim 7 serves as a mould and permanent container for the insecticidal material which is preferably of solid form at room temperatures. The article is disk-like or relatively low and flat.

I claim:

1. A container for insecticides comprising a disk-like piece of sheet material of polygonal shape having a main base portion adapted to receive and support the insecticidal substance, and corner portions bent over and above the surface of the base as a partial covering and in spaced but close substantially parallel relation thereto to provide space for insecticidal material between said base portion and covering, said covering having narrow slots therein through which insects may reach the space for the insecticidal substance and which slots are too narrow to permit access therethrough by animals, said base portion having a ridge extending upwardly constituting a lateral wall spaced from the corners with a depression in its center to hold insecticidal material, and said slots extending from the margin of the container and providing openings at the corners thereof for access to the interior of the container.

2. A container for insecticides comprising a disk-like piece of sheet material of polygonal shape, having a main base portion adapted to receive and support the insecticidal substance, and corner portions bent over and above the surface of said base portion as a partial covering in spaced substantially parallel relation thereto to provide space for insecticidal material between said base portion and covering, said covering having narrow slots therein through which insects may reach the space for the insecticidal substance, but too narrow to permit access therethrough to the interior space by animals, said base portion at the corners thereof being in a common plane, and said slots extending down to the common plane of said base portion at the corners thereof.

3. In a container for insecticides comprising a disk-like piece of sheet material substantially square having a main base portion adapted to receive and support the insecticidal substance, and corner portions of triangular shape bent over and above the surface of the base as a partial covering in spaced substantially parallel relation thereto, to provide space for insecticidal material between said base portion and covering, said triangular corner portions of said covering being spaced slightly apart to provide narrow diagonal slots therebetween extending across the surface of the article through which insects may reach the space for the insecticidal substance between the base and the covering but too narrow to permit access therethrough to the interior space by animals, said base portion at the corners being in a common plane, and said slots extending down to the common plane of said base portion at the corners of the container.

ROBERT L. HARROUN.